United States Patent Office 3,146,656
Patented Sept. 1, 1964

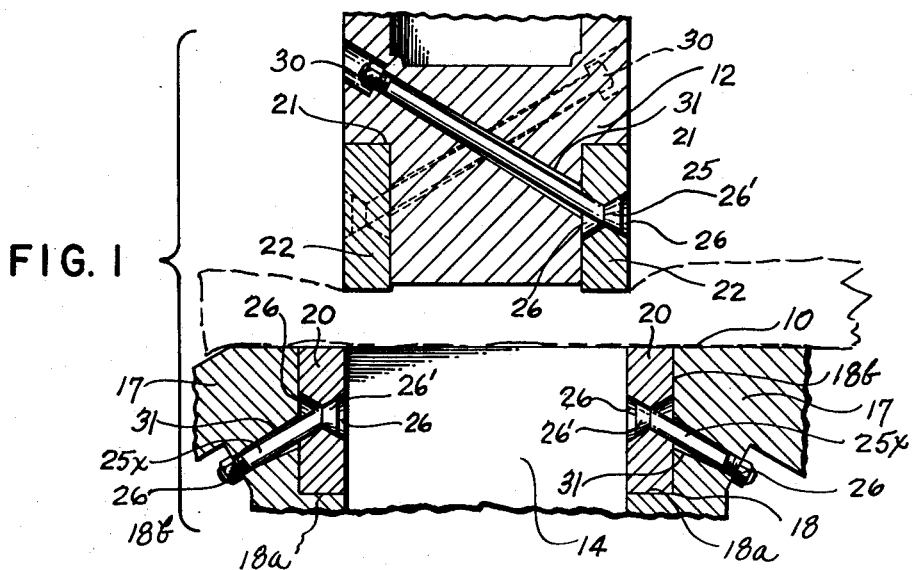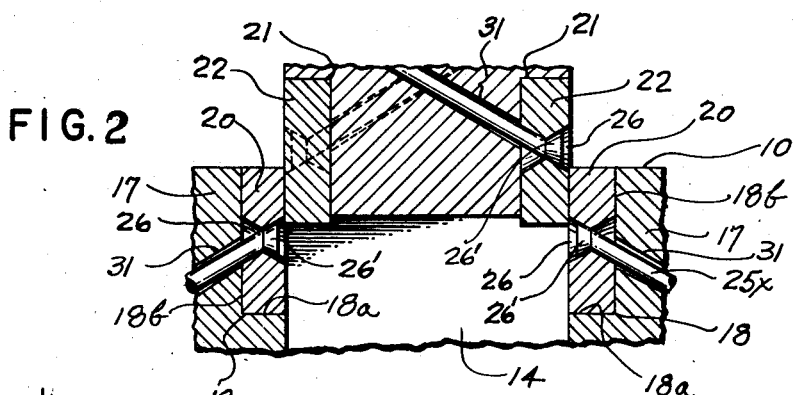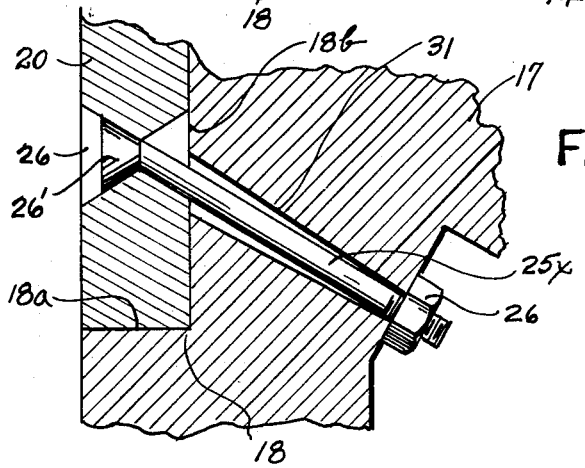

3,146,656
BLADE MOUNTING BOLTS
Arthur F. Richards, Seattle, Wash., assignor to Richards Shear Company, Seattle, Wash., a corporation of Washington
Original application Nov. 7, 1960, Ser. No. 67,624, now Patent No. 3,039,343, dated June 19, 1962. Divided and this application Feb. 5, 1962, Ser. No. 171,113
4 Claims. (Cl. 83—699)

This invention relates to two-way tightening bolt connections as employed in machines and mechanisms wherein bolt joined parts are subjected to exceedingly great tension and incident shearing forces. For example, it pertains to bolt connections that are subjected to conditions such as are the bolt connections disclosed in a co-pending United States Patent No. 3,039,343, issued June 19, 1962, entitled "Double Cutting Metal Shears," wherein coacting shear blades are anchored in their mounting jaws by means of bolts that are formed and applied in accordance with the disclosures and claims of the present invention.

This application is a divisional part of the above entitled co-pending United States application.

Specifically stated, the present invention pertains to bolt connections as employed for the securement of replaceable shear blades in seats provided therefor in the coacting jaws of a metal shear. However, it is not the intent that the drawings or description herein shall in any way operate to restrict the invention either to the particular machine disclosed or to any other particular mechanism so long as the disclosure does not render the invention inoperative for its intended objects.

In the above identified United States patent application, I have illustrated a metal shear that is designed for operation on conglomerate massed scrap materials including heavy metal casting, rods of various sizes and shapes, metal plates, wires, bars, etc., as advanced progressively and intermittently across a shear table to jaws in which coacting shear blades are fixed.

In the disclosure, a reciprocally actuated cross-head mounts shear blades in its opposite side edges for coaction with similar shear blades mounted by anvils associated with the shear table for making a double cut, through the conglomerate mass of material.

The shearing force exerted is exceedingly high and in this instance it is applied both for the shearing of and for crushing and compacting the sections of material as cut free. The shearing blades of the coacting jaws are in the form of elongated bars of rectangular cross-section, which are seated in their mounting jaws in such manner as to bear against surfaces that sustain the high pressure of the metal shearing and compacting operations. In the opening apart of the shearing jaws after making a cut, the drag on the blades, which are replaceably mounted, requires that they be bolted in their seats, and it is of great importance that the bolts as necessarily employed shall not be subjected to detrimental wear or shearing forces.

In view of the above statements and for various other reasons, it has been the principal object of this invention to provide novel and practical means for and a novel manner of securing the replaceable shear blades in the seats as provided therefor in their mounting jaws.

More specifically, it is the object of this invention to secure the replaceable shear blades in their seats by use of bolts of novel formation and mode of application, through which any drag to which the coacting blades are subjected will operate to more firmly seat the blades and thus lessen the drag.

Further objects and advantages of the present invention reside in the specific details of construction of the blade anchoring bolts herein employed, and in their angular application to the jaws and blades in the specific manner and purpose hereinafter described.

In accomplishing the above mentioned and other objects of the invention, I have provided the improved details of construction, the preferred forms of which are illustrated in the accompanying drawings, wherein:

FIG. 1 is a vertical cross-sectional view of a double cutting metal shear in which shear blades are mounted for co-action in accordance with the objects and advantages of the present invention; showing the jaws partially closed in a shearing operation.

FIG. 2 is a similar cross-sectional view showing the shear blades as closed together.

FIG. 3 is an enlarged sectional detail of a blade anchor bolt and its mounting.

It is to be understood that shears adapted for heavy duty metal cutting and compacting may be single or double cutting or of other types and may be employed in combinations with parts other than herein shown. It is not the intent that the present application, or the disclosed idea of this certain type of shear shall operate to restrict the invention to any specific machine or arrangement of parts.

Referring more in detail to the drawings:

10 designates what will herein be referred to as a "shear table" and 12 will designate a cross-head. The shear table in this instance is fixedly mounted on a suitable supporting foundation, not shown, and the cross-head is supported for vertical reciprocation in suitable guiding means, and also is powered by suitable means whereby it is caused in its reciprocal movements to be projected downwardly into and be lifted from a vertical passage 14 directed downwardly through the table top 15 and opening at its lower end into a laterally directed discharge chute, not herein shown.

It has been shown in these two views of this drawing that the vertical passage 14 through the table top is defined between two laterally spaced anvils 17—17 and these are formed along their top, inside edges with blade mounting seats 18—18, each with a horizontal bottom surface 18a and a vertical side surface 18b. Fitted to these opposedly related seats are the replaceable shear blades or bars 20—20, each of which has its inside face flush with the corresponding sidewall surface of passage 14 thus to define the width of the passage.

It has been shown in these two views that the cross-head 12 is formed along its opposite side faces, and opening to its lower edge with seats 21—21 in which replaceable shear blades 22—22 are seated. These seats are like those seats formed in the anvils, in that they have flat horizontal base surfaces and vertical inside surfaces.

The shear blades as applied within the seats as formed in the sidewalls of the anvils and in opposite sides of the cross-head are adapted to coact in the movement of the cross-head into the table top passage 14 for the shearing of the conglomerate mass of materials that may be fed into position for shearing.

It has been found, however, that with the opening of the jaws, after a shearing cut has been made, there is a heavy dragging force exerted on the replaceable blades that places their securing bolts under shearing strain and it is desirable that they be retained firmly in their seats in order to insure continued and satisfactory operation of the shear.

It is presently preferred, as shown in FIG. 1, that the replaceable blades 20—20 as applied in the seats of the cross-head be secured by the use of bolts 25 extended upwardly therethrough at a substantial angle with reference to a horizontal plane. It is also shown that the replaceable blades set in the seats of the anvils of the table top be secured by anchor bolts 25x that are directed therethrough, outwardly and downwardly through the anvils at a substantial angle relative to the horizontal plane.

To receive the anchor bolts the blades are formed with bolt passing holes 26 that are formed therethrough by coaxially aligned conical bores directed thereinto from opposite sides of the blades perpendicularly to its side faces, and which holes are adapted, when blades are properly seated to register with the inner ends of bolt passing holes of the blade mounting jaws. The bolts are to be equipped with securing nuts 30 at their outer ends whereby they can be drawn tight. The particular disposition of the bolts here shown provides that the nuts are easily acessible for removal to permit reversal or replacement of blades. At their inner ends, the bolts have conical heads 26' that will seat well within the conical inwardly tapered ends of the blade holes and within the vertical plane of shearing edge surfaces of the coacting blades. The heads of the bolts are ground or otherwise machined to provide a firm or solid seat and engagement in the holes 26 in any position or angularity of the bolts. The bolt holes 31 as formed through the blade mountings are tapered from their inner ends to their outer ends so that the bolts as contained therein will have a substantial amount of clearance about their inner end portions to provide for blade sharpening adjustment but closely fit in the outer end portions of the holes. When the blades are properly seated and the securing bolts properly applied thereto, the relationship of the bolt heads to their seats holds the bolts against rotation and permits tightening or loosening of the bolt securing nuts.

The bolt design and angular positioning also provides that the tendency of the blade bars to pull away from the backing metal forming the blade seats with the opening of the blades, is overcome and the shearing strain on the bolts is avoided. It will be understood that in the usual arrangement of anchor bolts in close fitting holes through the blade bars and mounting members, the opening of the shear will have a tendency to drag and will pull the blade bars away from their seats, thus to allow blade backing shims to slip and wear and a shearing force to be placed on the blade securing bolt by reason of their right angle relationship to blade slippage. However, in the disposition of the bolts in angular positions as shown, the shearing tendency is avoided by reason of the permitted lateral movement of the bolts, and the bolts are placed under greater tension which operates to draw the blade bars more firmly against their vertical seating surfaces and thus eliminates the usual tendency to drag and bind during opening movements of the shear.

It is a commonly acknowledged property of steel that the elongation strength is substantially greater than the shear strength and in the construction and use of the bolts as herein described, I am utilizing this substantial strength advantage. I further provide means of firmly anchoring or seating of the blade without a specific limitation or requirement relative to the angularity of the bolt. With the bolts angularly positioned, the blades are drawn into a firmly seated position against both engaging surfaces between the seat and blade. To accomplish this result it is only necessary that the bolt extend at a bisecting angle between the plane of the seating surfaces.

The manner of forming the bolt holes 26 through the blade bars permits the blades to be reversed and interchanged without interference with use of the bolts 25 and 25x with conical heads as shown.

The advantages of the angular arrangement of anchor bolts relative to the direction of movement of the cross-head and the provision of tapered clearance for their mounting as provided by the tapered holes 31, resides mainly in the removal of shearing strain on the bolts, and the placing of the bolts under greater tension, as the shear opens, with the result that the blades are drawn more tightly against their seats.

The manner of and means for securing the blades of the cross-head is substantially like that of the lower blades except tapered holes in the cross-head members as shown in FIG. 1.

Other advantages of the bolt configuration and the angular direction of the bolt holes are that it eliminates or substantially reduces the wear and deforming of blade seats 21—21 which occurs when the blades are loose. It also eliminates the need for shims between the blades and seats resulting from the wear. The novel bolts and blade securing means as herein described provides a two-way pressure and positioning of the blades to assure that they are properly seated. When blades are properly seated and held in position, the blade life is increased and there is a substantial reduction in the problems resulting from sheared bolts.

What I claim as new is:

1. In combination, a blade mounting member, a blade removably secured to said blade mounting member and a two-way securing and tightening bolt extending through said blade and mounting member to secure the blade in removably fixed position; said bolt including a conical head portion and a shank portion angularly extending from said head portion; said blade being generally rectangular in shape and including opposed conical recesses formed in opposite sides thereof; said mounting member including a blade supporting seat having at least two generally flat blade engaging surfaces formed in right angle relationship, a bolt passage formed in and through said mounting member and opening at one end to one of said blade engaging surfaces, said bolt passage being angularly directed with relationship to the blade engaging surface whereby the bolt when tightening force is applied will cause the blade to seat in firm engagement against each of said blade engaging surfaces.

2. The combination as in claim 1 wherein the bolt passage is tapered and larger at the engaging surface end.

3. The combination as in claim 1 wherein the opposed conical recesses are medially formed between opposed top and bottom edges of the blade whereby the blade may be reversed for application to said mounting member.

4. The combination as in claim 1 wherein the angularity of said conical recesses corresponds generally to the angularity of said bolt passage.

References Cited in the file of this patent

UNITED STATES PATENTS

| | | |
|---|---|---|
| 614,911 | Weber | Nov. 29, 1898 |
| 2,593,144 | Hercik | Apr. 15, 1952 |
| 2,814,345 | Repper | Nov. 26, 1957 |

FOREIGN PATENTS

| | | |
|---|---|---|
| 148,873 | Austria | Mar. 10, 1937 |
| 653,072 | Germany | Nov. 13, 1937 |